N. A. CHRISTENSEN.
CONTROLLING VALVE FOR SELF STARTERS.
APPLICATION FILED DEC. 8, 1913.

1,211,410.

Patented Jan. 9, 1917.
2 SHEETS—SHEET 1.

Witnesses:
Fred Palm
Chas. L. Goss

Inventor:
Niels A. Christensen
By Flanders Bothun + Wsett + Bothun
Attorneys.

N. A. CHRISTENSEN.
CONTROLLING VALVE FOR SELF STARTERS.
APPLICATION FILED DEC. 8, 1913.
1,211,410.
Patented Jan. 9, 1917
2 SHEETS—SHEET 2.
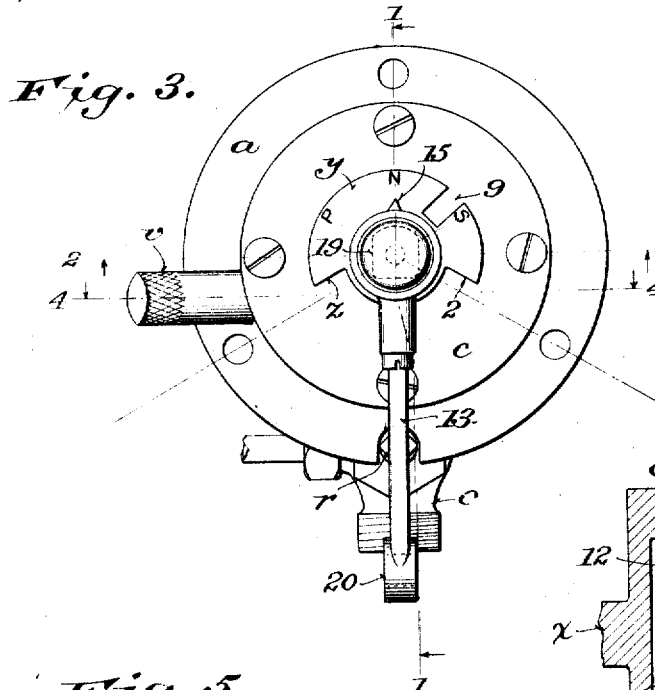
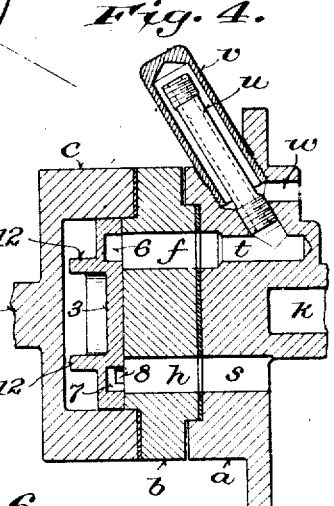
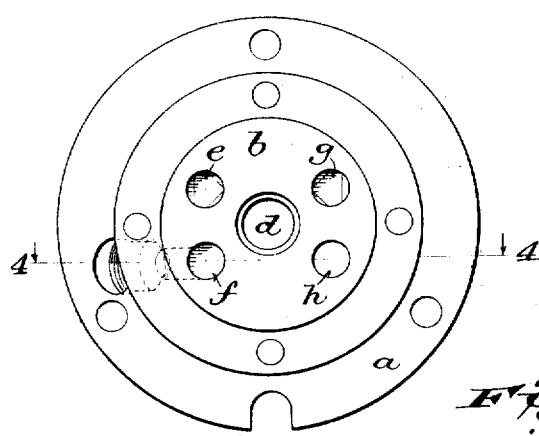
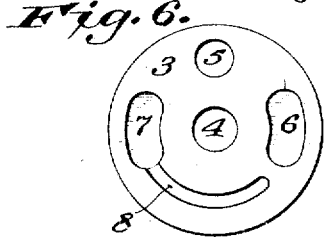
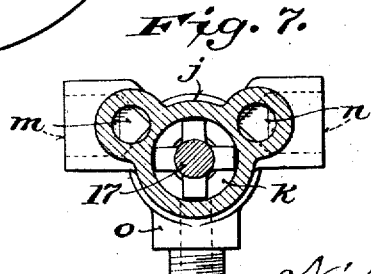
Witnesses:
Fred Palm
Chas L Goss
Inventor:
Niels A. Christensen,
By Flanders Bottum Fawsett & Bottum
Attorneys.

UNITED STATES PATENT OFFICE.

NIELS A. CHRISTENSEN, OF MILWAUKEE, WISCONSIN.

CONTROLLING-VALVE FOR SELF-STARTERS.

1,211,410.   Specification of Letters Patent.   Patented Jan. 9, 1917.

Application filed December 8, 1913. Serial No. 805,288.

*To all whom it may concern:*

Be it known that I, NIELS A. CHRISTENSEN, a citizen of the United States, residing at Milwaukee, in the county of Milwaukee and State of Wisconsin, have invented certain new and useful Improvements in Controlling-Valves for Self-Starters, of which the following is a specification, reference being had to the accompanying drawing, forming a part thereof.

This invention relates particularly to a valve for controlling the connections between the tank or reservoir for compressed air or other starting fluid, the compressor and the engine in apparatus for starting internal combustion engines. Its main objects are to provide against depletion of the tank or reservoir by leakage in the selector valve or as a result of accidentally turning the selector valve into or leaving it in starting or abnormal position, to facilitate the inflation of tires or supply of compressed air for other purposes directly by the compressor or from the tank or reservoir, to prevent unauthorized manipulation of the valve and operation of the starting apparatus, and generally to improve the construction and operation of devices of this class.

It consists in the construction, arrangement and combination of parts as hereinafter particularly described and pointed out in the claims.

In the accompanying drawing like characters designate the same parts in the several figures.

Figure 1:
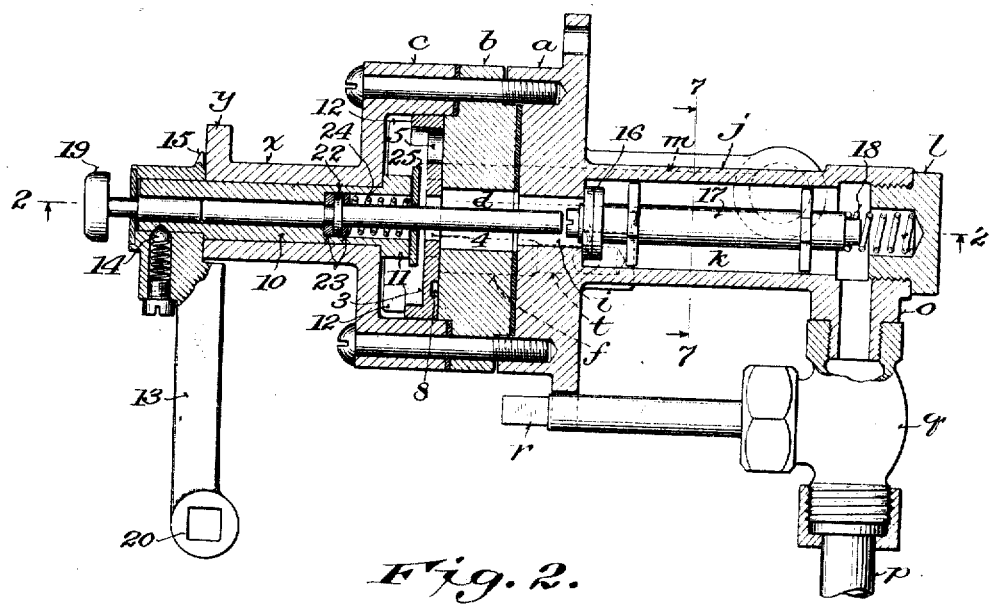
Figure 2:
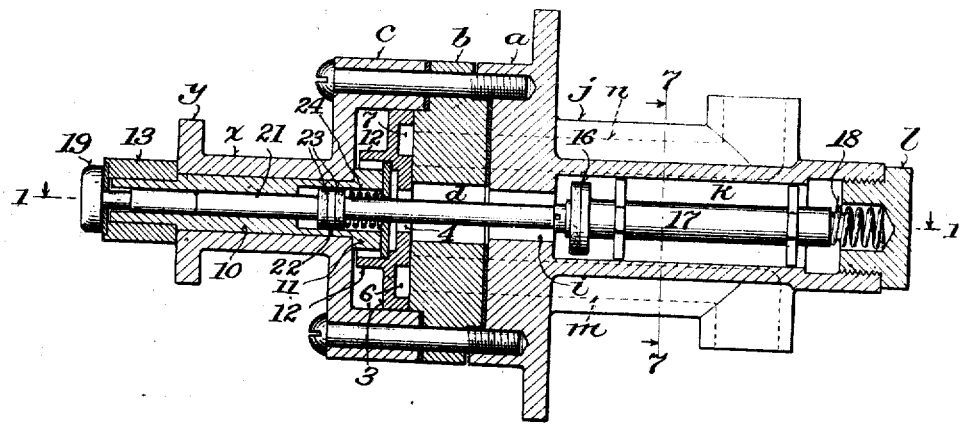

Figure 1 is a vertical section on the line 1—1, Figs. 2 and 3, of a valve embodying the invention; Fig. 2 is a horizontal longitudinal section of the valve on the line 2—2, Figs. 1 and 3; Fig. 3 is a front end view of the valve; Fig. 4 is a horizontal section on the line 4—4, Figs. 3 and 5; Fig. 5 is a face view of the selector valve seat and base; Fig. 6 is a face view of the selector valve; and Fig. 7 is a vertical cross section on the line 7—7, Figs. 1 and 2.

The valve comprises a case composed of a base section $a$, a seat section $b$ and a recessed cover $c$, the cover being bolted with the seat section to the base section and forming with the seat section, the selector valve chamber. The seat section is formed, as shown in Fig. 5 with a central opening or port $d$, which for convenience may be called the supply port, and with ports $e$, $f$, $g$ and $h$, of which the ports $e$ and $g$ may for convenience be called service ports and the ports $f$ and $h$ exhaust ports.

The base $a$ is formed with a central opening or port $i$, which registers with and forms a continuation of the port $d$ in the valve seat, as shown in Figs. 1 and 2. It is also formed in a neck or extension $j$, as shown in Figs. 1, 2 and 7, with a central chamber $k$, communicating at one end with the port $i$ and closed at the opposite end by a screw cap $l$. On each side of the chamber $k$ the neck or extension $j$ is formed with passages $m$ and $n$, which communicate at one end with the ports $e$ and $g$ respectively in the valve seat, and at the opposite end are formed with laterally opening pipe connections, the passage $m$ being in practice connected by a pipe with a pump or compressor and an automatic controller, and the passage $n$ being connected with distributing valve mechanism for admitting the compressed starting fluid to the engine cylinders on the firing strokes of their pistons, substantially as shown and described in my application Serial No. 630,630, filed June 1, 1911. The neck or extension $j$ is also formed with a downwardly or laterally projecting pipe connection $o$, communicating with the chamber $k$ at the end next to the cap $l$, for connecting the valve with a tank or reservoir, as shown in my former application above mentioned.

The pipe $p$ connecting the valve with the tank or reservoir, may be provided, as shown in Fig. 1, with a stop cock or valve $q$, to close the connection between the selector valve and the tank or reservoir, and thereby prevent depletion of the latter by leakage of the selector valve and its connections when the device is to remain out of use for any considerable time. The cock or valve $q$ has a squared stem $r$ projecting through an opening in the flange of the base $a$, for opening and closing the cock or valve, as hereinafter explained.

As shown in Fig. 4, the base $a$ is formed with a through port $s$, registering at one end with the exhaust port $h$ of the valve seat, and communicating at the other end with the atmosphere. It is also formed with a blind port $t$, registering at one end with the exhaust port $f$, and communicating through a lateral opening with a nozzle $u$, for the inflation of tires or other uses to which the compressed air or starting fluid may be applied. A screw cap $v$, removably threaded in an opening in the base *a* around the nozzle, forms therewith a passage normally connecting the port *t* and the exhaust port *f* with an auxiliary exhaust port *w*, formed in the base and open to the atmosphere. This arrangement provides for an easily accessible hose connection for inflating tires, etc., on the front or exposed side of the base *a*, which is in practice mounted on the dash or footboard of an automobile, while the auxiliary exhaust port *w*, with which the main exhaust port *t* is connected by the cap *v* when the hose connection is not in use, opens on the back side of the base into the motor hood, where the escape of the exhaust from the controlling valve is unobjectionable on account of noise or otherwise.

The cover *c* of the valve case is formed, as shown in Figs. 1 and 2, with a tubular neck *x*, in axial alinement with the central openings or ports *d* and *i* in the valve seat *b* and base *a*. This neck terminates at its front or outer end in a segmental flange *y*, graduated or marked on its front face, as shown in Fig. 3, to indicate the different positions of the selector valve, and terminating in shoulders *z* and 2, which form stops for the valve operating handle hereinafter described.

A rotary or oscillatory selector valve 3, consisting of a disk accurately faced and fitted to the face of the valve seat *b*, and fitted to turn in the cover *e*, has a central port or opening 4, communicating with the supply port *d* and a through port 5, adapted to register in different positions of the valve with the service ports *e* and *g* and the exhaust port *f*. In its working face the valve 3 is formed with cavities 6 and 7, which are adapted to bridge and connect the ports *e* and *f* and the ports *g* and *h* respectively, in the neutral or central position of the valve. An extension 8 of the cavity 7 is formed in the face of the valve to connect the service port *g* with the exhaust port *h* when the through port 5 is turned into register either with the service port *e* for charging the tank or reservoir, or with the exhaust port *f* for inflating tires or taking compressed air for other purposes directly from the tank or reservoir, and under such conditions to permit any leakage of compressed air between the valve 3 and its seat *b* to escape through the ports *h* and *s*, without effect on the starting mechanism.

A tubular valve operating stem 10, fitted to turn in the neck *x*, has a squared head 11 at its inner end, fitting between parallel ribs 12 on the outer face of the valve 3, as shown in Figs. 1 and 2. The outer end of the stem 10, protruding beyond the flange *y*, is squared, and the hub of a handle 13 is removably fitted thereon. A spring pressed ball or detent 14, in the hub of the handle, by engagement with a notch or depression in the stem 10, holds the handle in place on the stem, as shown in Fig. 1. The hub of the handle is provided on the upper side with an index or pointer 15, indicating on the flange *y*, which is marked P, N and S, the pumping, neutral and starting positions respectively, of the valve 3. By partially withdrawing the handle from the stem 10 so that its shank will clear the stop shoulder 2, it can be turned with the valve 3 farther to the right, or contraclockwise, to bring the port 5 into register with the port *f*, when the shank of the handle will be opposite and may be pushed back into engagement with the notch 9, for inflating tires, etc., directly from the tank or reservoir.

A stop valve 16, having its stem 17 guided in axial alinement with the chamber *k*, is normally held by a spring 18 against its seat at one end of said chamber around the opening or port *i* in the base *a*, as shown in Fig. 1, thereby closing communication between the tank or reservoir and the chamber of the selector valve in the recessed cover *c*.

The hub of the handle 13 is provided with a push button 19, whose stem is confined therein in axial alinement with the bore of the stem 10 and is removable therefrom with the handle so as to prevent or render difficult, unauthorized manipulation of either the selector valve 3 or the stop valve 16. The handle 13 is formed at the end opposite its hub, as shown in Fig. 1, with an opening or wrench head 20, fitting the squared end of the valve stem *r* for opening and closing the stop cock or valve *q*.

A push rod 21, fitted and guided in the bore of the stem 10, projects through the openings or ports 4 and *d* into the port *i* in the base *a*, in alinement with the stop valve 16. This rod is provided with a collar 22, and packing rings or washers 23 on opposite sides of said collar fitting an enlargement of the bore in the inner end of the stem 10 and preventing leakage of the compressed air or other fluid from the valve chamber in the cover *c* through said stem. The rod 21 is held normally out of contact with the valve 16, and the packing ring 23 on the outer side of the collar 22 is held tightly against its seat or a shoulder at the outer end of the enlargement of the bore in said stem, as shown in Fig. 1, by a spring 24, interposed between the inner ring 23 and a plate 25 seated, as shown in Fig. 2, on the outer side of the valve 3 at a distance from the central port or opening 4.

In the operation of the device, to start the engine with which the controlling valve is connected, the tank or reservoir being charged with compressed air or starting fluid, the handle 13 is turned from its middle or neutral position, as shown in Fig. 3, to the left or clockwise, till the shank of the handle engages the shoulder *z* and the index 15 points to the letter S on the flange *y*. By this movement of the handle the through port 5 in the selector valve is brought into register with the service port $g$, which is connected through the distributing valve mechanism with the engine. The push rod 21 is then thrust inward by the push button 19 against the stop valve 16, which is thereby opened, as shown in Fig. 2. Compressed air or starting fluid is thus admitted from the tank or reservoir through the pipe $p$, valve chamber $k$, ports $i$, $d$ and 4, into the valve chamber in the cover $c$, from which it passes through the ports 5 and $g$, the passage $n$ and the pipe connected therewith, to the engine, under control of the distributing valve mechanism.

As soon as the engine starts and begins to function normally, which will occur ordinarily after the admission to the engine of a very few charges of the starting fluid, the push button 19 is released and the valve 16 is instantly closed by the spring 18, thereby completely cutting off the supply of the compressed starting fluid from the tank or reservoir to the selector valve through the port $i$ and preventing waste of such fluid by leakage in the selector valve or otherwise, and depletion of the tank or reservoir. The handle 13 is then turned back to its neutral position, in which the index 15 points to the letter N on the flange $y$. In this position of the handle the through port 5 in the selector valve is turned out of register with the port $g$ and closed, and the cavity 7 is turned back into position to connect the ports $g$ and $h$. The compressed fluid is thus released from the distributing valve mechanism and its controller through the pipe connection leading therefrom to the passage $n$, thence through the port $g$, cavity 7, and ports $h$ and $s$, to the atmosphere.

To start the pump or compressor for charging the tank or reservoir with compressed air or starting fluid, the handle 13 is turned from its middle or neutral position to the right, or contraclockwise, until its shank engages with the stop shoulder 2. The through port 5 is thus brought into register with the port $e$. The stop valve 16 being now opened by means of the push button 19, as above explained, if there is sufficient pressure in the tank or reservoir the compressed fluid will pass therefrom through the chamber $k$, ports $i$, $d$ and 4, into the selector valve chamber in the cover $c$, thence through the ports 5 and $e$, passage $m$ and the pipe connected therewith, to the compressor controller, thereby starting the pump or compressor. If there is insufficient pressure in the tank or reservoir for this purpose, the pump or compressor is started manually.

After the pump or compressor is started, it forces air through the pipe connected with the passage $m$, thence through the ports $e$ and into the selector valve chamber in the cap $c$, thence through the central opening or port 4 in said valve, opening the stop valve 16 against the tension of the spring 18, said valve acting now as a check valve. Passing through the chamber $k$, the compressed air is delivered by the pipe $p$ into the tank or reservoir. When the pressure in the tank or reservoir has reached the desired limit, as indicated by a gage (not shown) the handle 13 is turned back to its middle or neutral position, carrying the port 5 out of register with the port $e$ and moving the cavity 6 into position to connect the port $e$ with the port $f$, thereby cutting off the compressor or pump from communication with the tank or reservoir and connecting it with the atmosphere through the port $e$, cavity 6, port $f$, nozzle $u$, cap $v$ and auxiliary exhaust port $w$. The compressed air being thus released from the pipe connecting the pump or compressor with the controlling valve, the pump or compressor is stopped. At the same time, the release of compressed air from the selector valve chamber in the cap $c$, permits the valve 16 to be closed by the spring 18 and the pressure in the tank or reservoir. The tank or reservoir is thus cut off from the selector valve chamber, thereby avoiding any diminution of pressure in the tank or reservoir by leakage in the selector valve or its connections.

If it is desired to inflate tires or supply compressed air for any other purpose directly from the pump or compressor, the cap $v$ is removed and a hose attached to the nozzle $u$. The handle 13 is then turned to the right or contraclockwise, to start the pump or compressor, as above explained, by the admission of compressed air from the tank or reservoir to the pump controller. After the pump or compressor has been started, the handle 13 is turned slowly back to its middle or neutral position so as to prevent stopping the pump or compressor by sudden release of air from its controller. This slow movement of the selector valve back to its middle or neutral position in which the port $e$ is connected through the cavity 6 with the port $f$, throttles the passage of air through said ports till sufficient pressure is established in the hose connected with the nozzle $u$ to keep the pump or compressor in action.

When the hose is disconnected from a tire and air released therefrom, the pump or compressor will be automatically stopped by its controller as a result of such release of pressure from the pipe connecting the controlling valve with the pump or compressor controller.

In case it is desired to inflate a tire or supply compressed air for any other purpose directly from the tank or reservoir independently of the pump or compressor, the handle 13 is partially withdrawn from the stem 10 and turned to the right, or contra-clockwise, until its shank is opposite the notch 9 in the flange y. In this position of the handle the valve port 5 registers with the port f, and upon pressing the button 19 inwardly to open the valve 16, compressed air will flow from the tank or reservoir through the chamber k, ports i, d and 4, into the chamber in the cap c, thence through the ports 5, f, and t to the nozzle n. The flow of air from the tank or reservoir to the nozzle is cut off by simply releasing the push button 19, which permits the valve 16 to be closed by the fluid pressure behind it, aided by the spring 18.

In charging the tank or reservoir from the pump or compressor with the valve port 5 in register with the service port e, and in taking compressed air directly from the tank or reservoir for the inflation of tires or other purposes, when the valve port 5 is in register with the exhaust port f, the service port g is connected by the cavity 7 and its extension 8 with the exhaust port h, so that any leakage of compressed air from the valve chamber between the face of the valve and its seat, will escape directly to the atmosphere through the ports h and s, without affecting the starting mechanism.

Various modifications in minor details of construction and arrangement of parts may be made without materially affecting the principle and mode of operation of the device and without departing from the scope of the invention as defined in the following claims.

I claim:

1. In a controlling valve for self-starters, having supply and service ports and an exhaust port open to the atmosphere, the combination of a selector valve adapted to open and close communication either between service and supply ports or between service and exhaust ports, a self-closing stop valve in the supply port operating independently of pressure in the selector valve chamber and means for manually opening the stop valve independently of the operation of the selector valve.

2. In a controlling valve for self-starters, the combination of a case having supply, service and exhaust ports, a rotary selector valve controlling communication between certain of said ports, a tubular stem rotatably mounted in the valve case in engagement with the selector valve and having an enlarged bore in its inner portion forming an internal shoulder, a spring seated stop valve normally closing said supply port, a push rod fitted in said stem in alinement with the stop valve and provided with a collar and packing fitting the enlarged bore in said stem, a spring interposed between said collar and the selector valve and normally holding said packing against said shoulder, a handle removably fitted on said stem for turning the selector valve and provided with a push button removable therewith for thrusting the push rod inward and opening the stop valve.

3. In a controlling valve for self-starters, the combination of a valve case having service, exhaust and auxiliary exhaust ports, a nozzle attached to the case in communication with the exhaust port, a cap removably connected with the case over said nozzle and forming a passage connecting the exhaust port with the auxiliary exhaust port, and a selector valve adapted to connect and disconnect the service and exhaust ports.

4. In a controlling valve for self-starters, the combination of a valve case having supply, service, exhaust and auxiliary exhaust ports, a nozzle attached to the case over the exhaust port, a cap removably connected with the case and forming a passage connecting the exhaust port with the auxiliary exhaust port, a selector valve adapted in different positions to connect and disconnect the supply and service ports and to connect and disconnect the service and exhaust ports, a self-closing stop valve normally closing the supply port independently of the selector valve, and means for opening the stop valve.

5. In a controlling valve for self-starters, the combination of a case provided with a valve seat having a central supply port and service and exhaust ports at a distance from the center, means for connecting a hose or pipe with the exhaust port, a rotary selector valve having a central opening in constant communication with said supply port, a through port adapted to register with either the service or exhaust port and a cavity adapted to connect the service and exhaust ports, and means for turning said valve.

6. In a controlling valve for self-starters, the combination of a valve case having a pumping or service port and main and auxiliary exhaust ports, means for detachably connecting a hose with the main exhaust port, a removable cap connected with the valve case over the hose connection and normally forming a passage which connects the main exhaust port with the auxiliary exhaust port, and a valve adapted in different positions to connect and disconnect the service and main exhaust ports.

7. In a controlling valve for self-starters, the combination of a valve case having a supply or reservoir port, pumping and starting or service ports, and exhaust ports associated with said service ports, a selector valve adapted in different positions to connect the reservoir port with the pumping and the starting ports and having cavities adapted in another position of the valve to connect said pumping and starting ports with the associated exhaust ports, one of said cavities being extended to connect the starting port with the associated exhaust port when the selector valve is in position to connect the reservoir port with the pumping port, and means for operating said valve.

8. In a controlling valve for self-starters, the combination of a valve case having a supply or reservoir port, pumping and starting or service ports and exhaust ports associated with said service ports, means for detachably connecting a hose with one of the exhaust ports, a selector valve adapted in different positions to connect the supply port with the service ports and with the exhaust port having the hose connection, and having cavities adapted in another position of the valve to connect the service ports with the associated exhaust ports, one of said cavities being extended to connect the starting service port with the associated exhaust port when the valve is in position to connect the reservoir port either with the pumping service port or with the exhaust port having the hose connection, and means for operating said valve.

In witness whereof I hereunto affix my signature in presence of two witnesses.

NIELS A. CHRISTENSEN.

Witnesses:
CHAS. L. GOSS,
FRED PALM.